United States Patent
Cho

(10) Patent No.: US 8,867,563 B1
(45) Date of Patent: Oct. 21, 2014

(54) CONTENT OPTIMIZATION OF A PHYSICAL LAYER PREAMBLE

(75) Inventor: James Cho, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 741 days.

(21) Appl. No.: 12/869,563

(22) Filed: Aug. 26, 2010

Related U.S. Application Data

(60) Provisional application No. 61/354,538, filed on Jun. 14, 2010.

(51) Int. Cl.
*H04L 12/28* (2006.01)

(52) U.S. Cl.
USPC ........... 370/461; 370/335; 370/437; 370/441; 370/447

(58) Field of Classification Search
USPC ......... 370/335, 342, 343, 332, 333, 437, 441, 370/447
See application file for complete search history.

(56) References Cited

U.S. PATENT DOCUMENTS

| | | | |
|---|---|---|---|
| 2005/0185671 A1* | 8/2005 | Hansen et al. | 370/466 |
| 2006/0050742 A1* | 3/2006 | Grandhi et al. | 370/506 |
| 2008/0109711 A1* | 5/2008 | Morioka et al. | 714/807 |
| 2010/0040158 A1* | 2/2010 | Aggarwal et al. | 375/260 |

* cited by examiner

*Primary Examiner* — Kibrom T Hailu
*Assistant Examiner* — Zewdu A Beyen
(74) *Attorney, Agent, or Firm* — Bever, Hoffman & Harms, LLP

(57) ABSTRACT

Embodiments of the present invention provide for content optimization of a physical layer preamble. In one embodiment of the invention, a method for encapsulating a payload for transmission through a network is disclosed. The method comprises the step of programming a legacy physical layer length value in a legacy physical layer preamble. The legacy physical layer preamble is configured such that it can be received by any legacy stations that may be on the network, and such that a separate physical layer length value can be derived from the legacy physical layer preamble. Using such a system, content optimization of a physical layer preamble is provided.

15 Claims, 5 Drawing Sheets

CONTENT OPTIMIZATION OF A PHYSICAL LAYER PREAMBLE

CROSS-REFERENCES TO RELATED APPLICATIONS

This application claims the benefit of priority from U.S. provisional application 61/354,538, filed on Jun. 14, 2010, which is incorporated herein in its entirety.

FIELD OF THE INVENTION

The invention relates generally to wireless local area networks (WLAN), and more specifically to WLAN protocols.

BACKGROUND OF THE INVENTION

When something is sent through the mail, it must be placed in a package, given the proper address, and moved through the system at the right time. It is no different when a packet of information is sent through a network. The protocol for how a packet is sent through a network may be defined by a network standard. The dominant standards for wireless local area networks (WLANs) are those of the IEEE 802.11 family. The 802.11 family of standards specify how information sent through the network should be packaged and how it should be addressed. A single 802.11 specification may define the protocol for both a physical layer (PHY) and media access control layer (MAC) of the communication transmission scheme. These two layers combine to prepare information for successful transmission through a wireless network.

The PHY is the first layer in the seven-layer open system interconnection (OSI) model for layered communications. The PHY defines the manner in which the raw zeros and ones that comprise a signal will be grouped into code words or symbols and then converted into a physical signal. The PHY also defines how this physical signal is transmitted through a physical link such as a cable or the air. In a wireless network, some information regarding the transmitted signal, such as modulation scheme and/or number of streams may be sent to one or more receiving devices. In a wireless communication device, the steps necessary to implement the PHY layer packaging may be accomplished by a radio frequency processing radio component, and a base band processing component. The radio modulates the signal in accordance with the relevant standard. Example modulation techniques include quadrature amplitude modulation (QAM), amplitude modulation (AM), and frequency modulation (FM).

The MAC layer is a sub-layer of the second layer of the OSI model. The MAC layer provides addressing and channel access control mechanisms so that several stations can communicate within a network. Medium access must be controlled because if different stations within a network broadcast at-will, the air would be filled with conflicting signals. Just as a group of people sitting in a room need to learn to take turns talking so that everyone can be heard, collision avoidance systems are necessary so that multiple stations on a wireless network are not talking at the same time thereby destroying the transmitted information. The channel access system used in the family of 802.11 standards is called carrier sense multiple access with collision avoidance mechanism (CSMA/CA). The operation of CSMA/CA can be described with reference to FIG. 1.

FIG. 1 illustrates four stations in a wireless network; station 100, station 101, station 102, and station 103. Whenever one of the stations wishes to access the medium it will sense the channel, basically listening to hear if someone else is talking. If the channel is busy, the station will wait a random amount of time, and then try to transmit again. Range indicator 104 shows the area over which station 100 can be heard. Range indicator 105 likewise shows the area over which station 101 can be heard. The configuration of stations and range indicators in FIG. 1 illustrates an initial problem with carrier sense collision avoidance methods. Since station 103 is outside range indicator 104, if station 100 is transmitting a message to station 101, station 103 will be unable to sense the transmission. Therefore, without an additional system, station 103 will begin transmitting, and station 101 may be overloaded and unable to understand the message from station 100.

The collision avoidance scheme used by the 802.11 family of standards may involve the transmission of two signals called request to send (RTS) and clear to send (CTS). The process can best be explained with reference again to FIG. 1. When station 100 wants to communicate with station 101, it will first check the medium to make sure it is clear, and will then send out an RTS signal. The RTS signal will be received by any stations within range indicator 104, which includes both station 102 and station 101. All stations on the network will have internal network allocation vectors (NAVs) that they can set in response to information contained within the RTS signal. As long as a station's NAV is not zero, it will continue to wait and act as if the channel is taken. In addition, when station 101 receives an RTS signal that indicates it will be the recipient of a packet, it will send out a CTS signal to all stations within range indicator 105, which includes station 103. Station 103 will in turn set its NAV with information contained within the CTS signal. In this way, collision avoidance is provided for the transmission from station 100 to station 101. The information within the CTS and RTS signals that are used to set the stations' NAVs that is necessary to orchestrate this system is delivered through headers that are added on to the message packets as they travel down through the OSI layers.

In the OSI model, each layer provides services to the layer above and receives services from the layer below. Headers are added on to data as it moves down towards transmission through the physical medium such that the data is continually encapsulated and repackaged into a format that the recipient layer can operate on. With reference to FIG. 2, packet 200 is comprised of PHY header 201, MAC header 202, miscellaneous headers 203, and payload 204. PHY header 201 is added onto the signal as it moves from the MAC layer into the PHY layer. Likewise, miscellaneous headers 203 and MAC header 202 are added onto the signal as it moves into the corresponding OSI layer. Headers are also commonly referred to as preambles.

A critical portion of PHY header 201 is the physical layer convergence protocol (PLOP). The PLOP contains, among other items, a bit stream that represents the length of the packet, and the rate at which the packet is being transmitted in bits per second. The PHY uses this information to properly detect the end of the packet, as this information will indicate the time it will take for the signal to be sent through the physical medium. This is extremely important for WLAN that are deployed indoors where there are several different paths a signal can take as it bounces around inside a building. In such a multipath environment, knowing the length of the signal is one way in which the PHY can screen out the effects of these reflections.

MAC header 202 comprises, among other items, a frame control field which tells the recipient station what kind of data to expect, a duration field, and address fields. The address fields include a sender address, a recipient address, and an access point address. The address fields aid the network in determining where the packet is going, and how to route a packet through the network. The duration field is the field that is used by the MAC to set the NAV values for stations that receive the packet and header. Before sending a CTS or an RTS signal out, a station will determine how long the packet transaction will take, and will program the duration field based on this calculation. It is through this process that the MAC header information sets when an individual station can access the medium.

In order for CSMA/CA to work, stations from different iterations of the 802.11 family need to be able to communicate to prior iterations. If a legacy station is unable to hear messages broadcasted by a modern station, the whole system of carrier sensing will fail. With reference to FIG. 1, assume that station 100 and station 101 are modern stations and station 102 is a legacy station. In a system that did not account for backward compatibility, when station 100 began broadcasting for purposes of sending a message to 101, station 102 would be unable to hear this broadcast. Therefore, when station 101 sends an acknowledgment signal back to station 100 to indicate that the information was received, it is possible that station 102 may have begun broadcasting and fatally interfere with the exchange between station 100 and station 101. If legacy stations broadcast independently of modern stations the medium will be taken up by chatter and the network will fail.

To allow for backwards compatibility, modern stations such as those configured to operate under the 802.11n and draft 802.11ac standards can be configured to produce packets that contain a unique form of PHY header. These PHY headers are comprised of two parts; a legacy physical layer (PHY) preamble comprising a legacy rate field and a legacy PHY length field, and a separate physical layer preamble that comprises the PLOP of the modern standard. The legacy PHY preamble is also sometimes referred to as the legacy spoof preamble. The legacy PHY preamble is always transmitted using six megabits per second (Mbps). At this rate, any 802.11 device using orthogonal-frequency division multiplexing (OFDM) will be able to decode the legacy PHY preamble. However, the legacy stations will not be able to decode the separate physical layer preamble, or any of the remaining portions of the packet. As a result, the legacy stations will keep quiet and be ultimately unaffected by the modern messages. This system will result in a quiet channel regardless of modern packet transfer in a network comprising legacy systems. This is important because oftentimes a user or network administrator cannot control the devices that are within the area of influence of a WLAN. It is therefore not suitable to allow the introduction of a legacy system to cause total failure of the network.

Payload 204 is the actual information that a user desires to transmit. Although PHY header 201 and its subsidiary legacy PHY preamble, MAC header 202, and miscellaneous headers 203 are absolutely necessary for payload 204 to be transmitted through the network, they are wasted space from the perspective of a perfectly efficient system. Although one cannot send a letter through the mail without an envelope, the weight of the envelope does affect the shipping cost of the letter. Given that modern wireless networks are able to send hundreds of thousands of packets per second, any minor decrease in the number of bits, or improvement in the information content in a packet header could lead to dramatic improvements in a network's overall efficiency and performance.

SUMMARY OF INVENTION

In one embodiment of the invention, a method for encapsulating a payload for transmission through a network is disclosed. In one step a legacy physical layer length value in a legacy physical layer preamble is programmed. The legacy physical layer preamble is configured such that a separate physical layer length value can be derived from it. The legacy physical layer preamble is configured such that the legacy physical layer preamble could be received by a legacy station on the network. Such an approach produces a method for encapsulating a payload for transmission through a network with a content optimized physical layer preamble.

DETAILED DESCRIPTION OF THE PREFERRED EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers such modifications and variations as come within the scope of the appended claims and their equivalents.

The current approach to packet transmission in state of the art 802.11 networks is inefficient. The physical layer preamble of packets on such networks contains redundant information. Embodiments of the present invention work towards optimizing the information content of the physical layer preamble of data packets, and the encapsulating headers of the packet as a whole. As an example, physical layer preambles for 802.11n may contain superfluous information. An 802.11n physical layer preamble contains a legacy preamble and a separate high-throughput physical layer convergence protocol (HT-PLCP). A draft 802.11ac physical layer preamble contains a legacy preamble and a separate very-high-throughput physical layer convergence protocol (VHT-PLCP). As mentioned previously, the legacy physical layer preambles are always coded in 6 Mbps as this is the lowest transmission rate OFDM will support. All legacy devices will be able to receive and comprehend the legacy preamble. The legacy preamble also contains a rate field and a length field in bytes. The HT-PLCP also contains a rate field and a length field where the length is specified in bytes. In either case, the length field in the separate physical layer preamble is redundant given the length field present in the legacy physical layer preamble.

Figure 1:
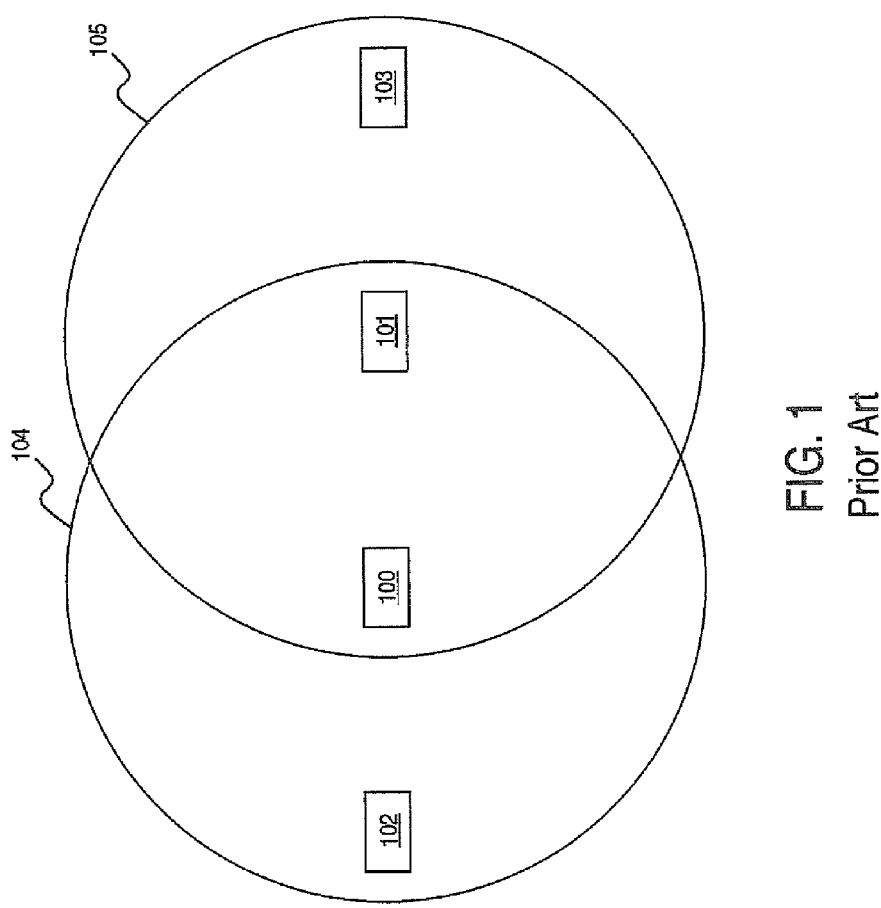
FIG. 1 illustrates a diagram of a prior art system that requires CSMA/CA for communication within the system.
Figure 2:
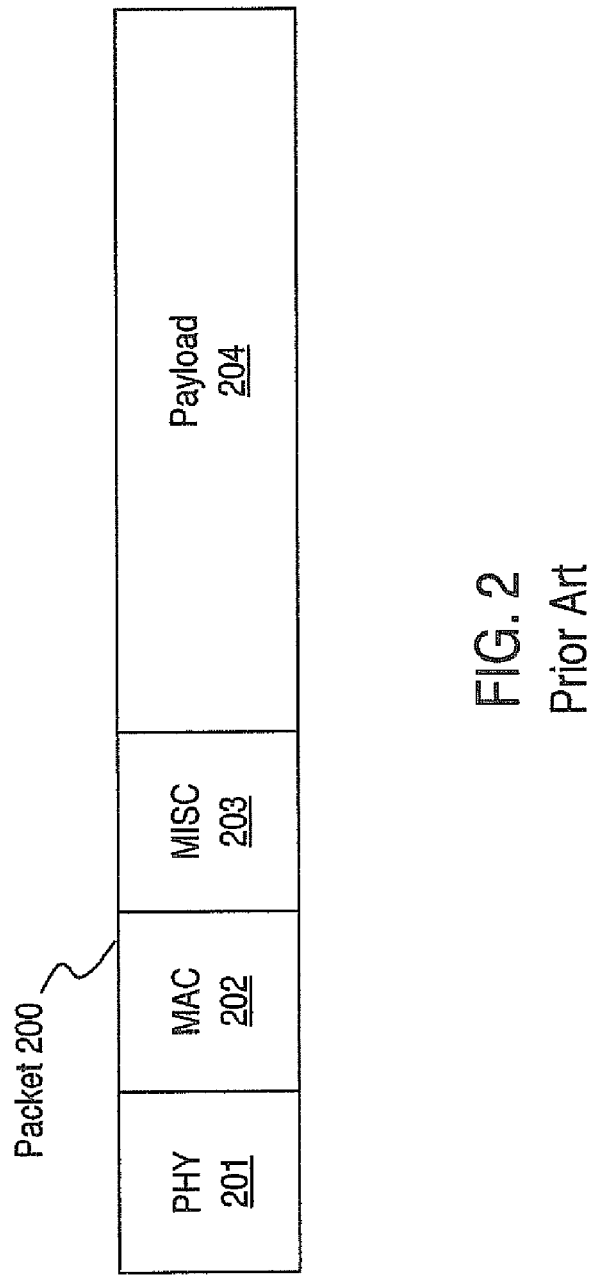
FIG. 2 illustrates a block diagram of a prior art data packet that can be transmitted through a network.
Figure 3:
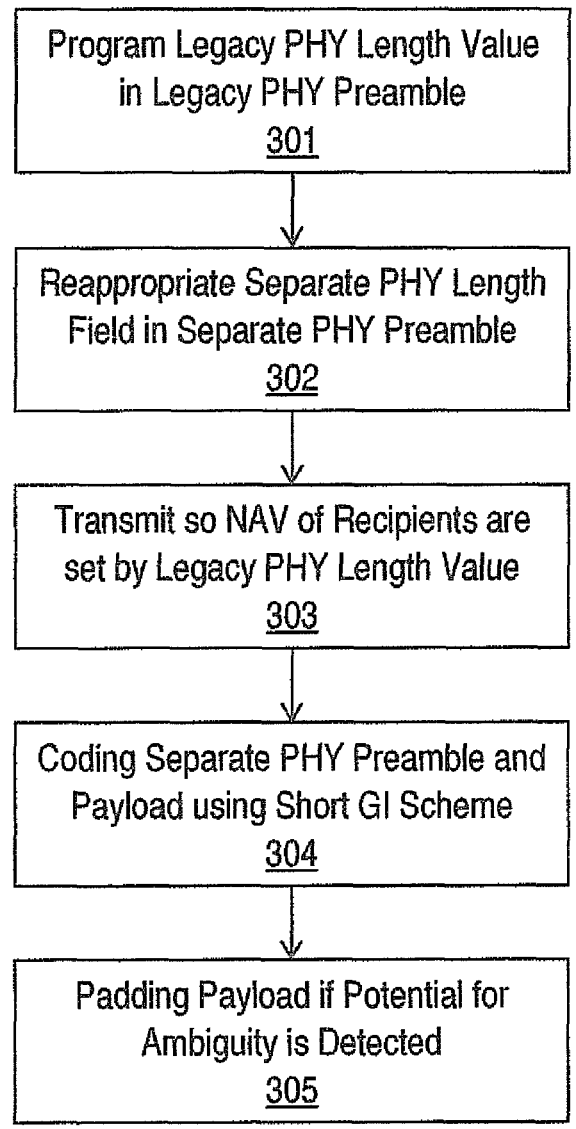
FIG. 3 illustrates a flow chart of a method for transmitting a packet that is in accordance with the present invention.

A specific embodiment of the invention wherein a payload is encapsulated for transmission through a network as a packet can be understood with reference to FIG. 3. In step 301 a legacy physical layer length value in a legacy physical layer preamble is programmed. The manner in which it is programmed is such that the information content of the physical layer preamble of the packet is optimized. The legacy physical layer preamble is configured so that a separate physical layer length value can be derived from the legacy physical layer preamble. In addition, the legacy physical layer preamble will still be able to serve the purpose of being detectable by any legacy stations connected to a network. Thereby, the legacy physical layer preamble is able to serve two distinct purposes without increasing in size. As such, specific embodiments of the invention will comprise smaller packet headers overall. As mentioned previously, header information is a necessary inefficiency in any network architecture. Therefore, decreasing the size of these packet headers can lead to significant gains in network efficiency.

In an exemplary embodiment, the packet would be sent through a network operating under the proposed 802.11ac standard. In this embodiment, step 301 would comprise programming the legacy physical layer preamble of the packet such that a recipient substation could derive the VHT-PLCP length value from it. In another exemplary embodiment, the packet would be sent through a network operating under the 802.11n standard. In this embodiment, step 301 would comprise programming the legacy physical layer preamble of the packet such that a recipient substation could derive the HT-PLCP length value from it.

Since the separate physical layer preamble length value can be derived from the legacy physical layer preamble, in a specific embodiment of the invention, the field in the separate physical layer preamble that contains this value can be reappropriated for other uses. In step 302, this separate physical layer length field is reappropriated to carry an alternative quantum of information. This alternative quantum of information could either increase the information content and commensurate functionality of the packet's header, or it could alleviate the need for a quantum of information in a different section of the packet's headers thereby decreasing the header size and increasing the efficiency of the network.

In a specific embodiment of the invention, the alternative quantum of information is a media access control layer duration. This exemplary embodiment of the invention would therefore allow increased functionality of the media access control layer, or increase the efficiency of the media access control layer header by freeing up space in that layer. In accordance with such an exemplary embodiment of the invention, in step 303 a packet containing the payload information could be transmitted by a station such that a NAV of a recipient station could be set based on this quantum of information. This is in contrast to prior art methods where the NAV was set using information from the media access control layer.

In the exemplary embodiment where the packet would be sent through a network operating under the 802.11n standard, the procedure for deriving the separate physical layer length value would involve a straight application of the value stored in the legacy physical layer preamble because they are both in units of bytes. All that would be necessary to determine the payload length would be to delete the deterministic number that is the length of the separate physical layer preamble in bytes. Contrarily, in the exemplary embodiment where the packet would be sent through a network operating under draft 802.11ac, this same procedure would be slightly more complex because the separate physical layer length value in the draft 802.11ac VHT-PLCP is in units of symbols and not in units of bytes.

In a specific embodiment where the physical layer length value is expressed in units of bytes, and the separate physical layer length is in units of symbols, it is still possible to derive one from the other. In most standards, the legacy preamble has a set number of bytes per symbol, and the length of the separate physical layer preamble in symbols is again a deterministic number. Therefore, the separate physical layer length value in symbols can be derived by dividing the legacy physical layer length value by the legacy number of bytes per symbol and subtracting the number of symbols in the separate physical layer preamble. When a packet is received, this operation can be used to determine the separate physical layer length value based on the received legacy physical layer length value. When a packet is transmitted this operation can be used in reverse to program the legacy physical layer length value based on the size of the payload the transmitting station would like to transmit.

In a specific embodiment, the legacy number of bytes per symbol divided by a legacy rate is always a factor of the size of the payload and separate physical layer preamble added together. In an exemplary embodiment, the payload is coded using normal guard interval coding, the legacy number of bytes per symbol is 3 (i.e., 24 bits), and the legacy rate is 6 Mbps. In normal guard interval coding, each symbol takes up 4 micro-seconds (µs). In this case, the legacy physical layer length divided by the legacy rate will always be a multiple of 4 µs because there are 24 bits per symbol. Therefore, no matter how many symbols are in the payload and separate physical layer preamble, their total size will be a multiple of 4 µs, and no matter how many symbols are specified in the legacy physical layer preamble, the length specified will also be a multiple of 4 µs. This exemplary embodiment therefore has the advantageous aspect of a one-to-one mapping of the legacy physical layer length value to the size of the payload and separate physical layer preamble combined.

In another specific embodiment, the legacy physical layer length value divided by the legacy rate is not always a factor of the length of the payload and separate physical layer preamble added together. In an exemplary embodiment, the payload is coded using short guard interval coding, the legacy number of bytes per symbol is 3, and the legacy rate is 6 Mbps. In short guard internal coding, each symbol takes up 3.6 µs. This exemplary embodiment does not have a one-to-one mapping of the legacy physical layer length value to the size of the payload and separate physical layer preamble combined because the legacy physical layer length values does not have sufficient resolution for this encoding. For every 9 symbols indicated by the legacy physical layer length values a single two-to-one mapping will be required.

An approach taken by a specific embodiment of the invention to solve the problem introduced in the prior paragraph can be described with reference again to FIG. 3. In step 304, the separate physical layer preamble and payload of a packet are coded using a short guard interval coding scheme. In step 305, the payload is padded with additional bits having zero values to eliminate the potential ambiguity. In another embodiment of the invention the potential ambiguity can be eliminated by using an extra bit in the separate physical layer preamble that could instruct a recipient station as to which of the two potential lengths was correct for the corresponding packet. In a still further embodiment of the invention, the potential ambiguity could be eliminated by applying a modulo (%) 3 operation on the length value and selecting between the two potential lengths based on the result of that operation.

Figure 4:
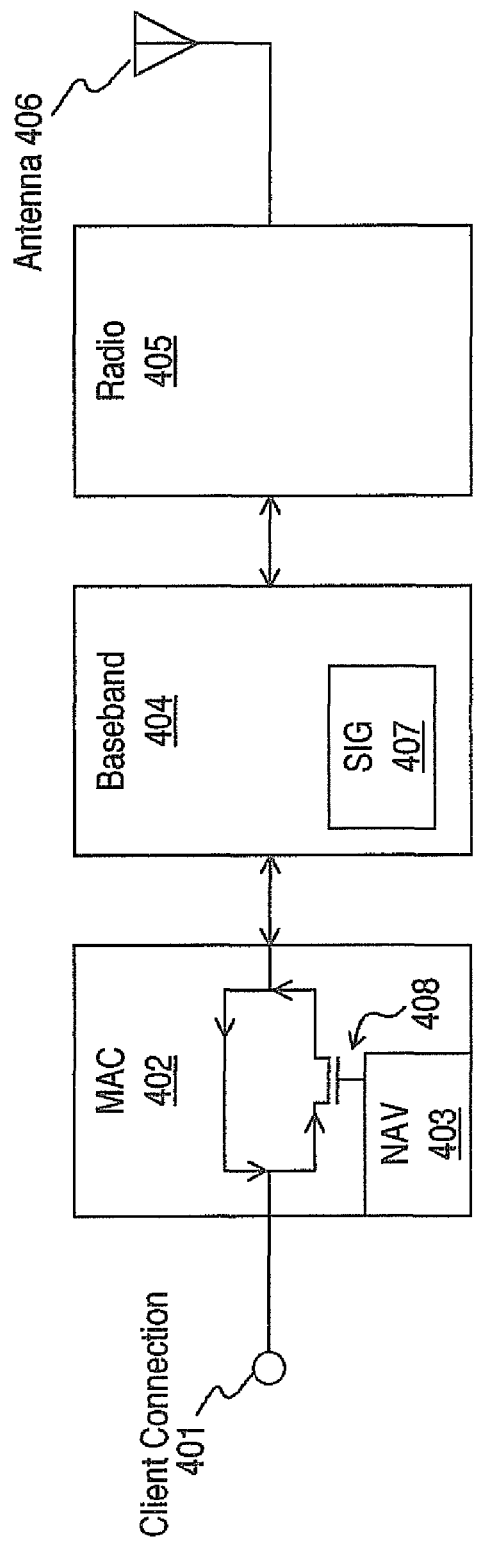
FIG. 4 illustrates a block diagram of an apparatus for transmitting a signal through a wireless network that is in accordance with the present invention.

A specific embodiment of the invention comprising an apparatus for encapsulating a payload for transmission through a network can be understood with reference to FIG. 4. FIG. 4 is a block diagram of a wireless communication device providing a client device with a connection to a wireless network through client connection 401. Note that the invention is not limited to use with wireless networks, and that FIG. 4 displays a specific embodiment for purposes of describing the invention. The wireless communication device comprises MAC control system 402 which has a network allocation vector processing system 403. MAC control system 402 can transfer signals to and from client connection 401 and baseband processing system 404. The wireless communication device additionally comprises radio 405 which can transfer a signal to and from baseband processing system 404 and antenna 406. Baseband processing system 404 contains a legacy signal processor 407 which is configured to derive a separate physical layer length value from information contained in a legacy physical layer preamble.

In a specific embodiment of the invention, legacy signal processor 407 is capable of converting a length value in a legacy physical layer preamble in units of bytes into units of symbols. Upon receiving a packet, legacy signal processor 407 will read the legacy physical layer preamble in units of bytes and will divide by the size of the symbol in the payload in units of micro-seconds. Legacy signal processor 407 will then subtract out a number of symbols in a separate physical layer preamble. In this manner, the symbol count of the payload will be derived from the legacy physical layer preamble.

In another specific embodiment of the invention, a network allocation vector in network allocation vector processing unit 403 will be set by a quantum of information stored in a separate physical layer length field. Since legacy signal processor 407 can derive the information that is otherwise in a separate physical layer length field, this field can be reappropriated for purposes of carrying an alternative quantum of information. This quantum of information can in turn be used by network allocation vector processing unit 403 to set when the wireless communication device can transmit. In FIG. 4, an exemplary embodiment is shown where switch 408 is controlled by network allocation vector processing unit 403 which can set when the wireless communication device can send a signal out from client connection 401.

Figure 5:
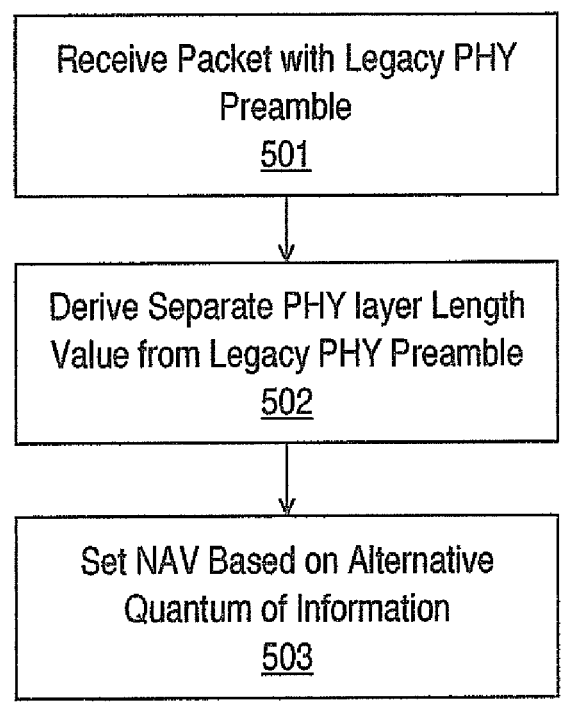
FIG. 5 illustrates a flow chart of a method for receiving a packet that is in accordance with the present invention.

A specific embodiment of the invention wherein an encapsulated packed is received from a network can be understood with reference to FIG. 5. In step 501, a packet with a legacy physical layer preamble is received by a station. The legacy physical layer preamble is configured so that any legacy station connected to the network would be able to receive and comprehend it. In step 502, a separate physical layer length value is derived from the legacy physical layer preamble.

In another specific embodiment of the invention, the separate physical layer length field in the separate physical layer preamble is reappropriated for purposes of carrying an alternative quantum of information. In accordance with such an embodiment, in step 503 the NAV of the station is set based on the alternative quantum of information. Therefore, if the recipient station is a legacy station it will comply with CSMA/CA based on information obtained from the legacy physical layer preamble, and if the recipient station is a modern station it will be able to properly obtain the separate physical layer length value from the legacy physical layer preamble. In effect, this specific embodiment can accomplish the functionality of prior art systems with lower overhead in terms of bit consumption, or it can provide for additional functionality given the same level of overhead.

Although embodiments of the invention have been discussed primarily with respect to specific embodiments thereof, other variations are possible. Various configurations of the described system may be used in place of, or in addition to, the configurations presented herein. For example, although the wireless communication device could be integrated into the same chip as the client device or have any other spatial-architectural relationship with the client device. In addition, the wireless communication device does not need to be a single system on a chip, because the individual components may be on separate substrates. Also, the radio could be an integrated radio. Although specific examples of the apparatus were given the apparatus disclosed comprises a set of components sufficient to execute any of the methods described herein. Also, the invention is not limited to use with an 802.11 standard as any networking standard benefits from decreased overhead and the other benefits of certain embodiments of this invention.

Those skilled in the art will appreciate that the foregoing description is by way of example only, and is not intended to limit the invention. Nothing in the disclosure should indicate that the invention is limited to systems that communicate through the use of charged particles, or systems that rely mainly on silicon. Neither should anything in the disclosure indicate that the invention is limited to wireless networks, or wireless networks where the transmission medium is air. Functions may be performed by hardware or software, as desired. In general, any diagrams presented are only intended to indicate one possible configuration, and many variations are possible. Those skilled in the art will also appreciate that methods and systems consistent with the present invention are suitable for use in a wide range of applications encompassing any related to intersystem communication.

While the specification has been described in detail with respect to specific and exemplary embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A method for encapsulating a payload for transmission through a network comprising:
    programming a legacy physical layer length value in a legacy physical layer preamble, wherein said legacy physical layer length value is expressed in units of bytes, wherein said legacy physical layer preamble is configured to be properly received by a set of stations on a network, even if a legacy station is in said set of stations;
    reappropriating a separate physical layer length field in a separate physical layer preamble to carry an alternative quantum of information, wherein the separate physical layer length field is originally appropriated to include a separate physical layer length value that is derived by dividing the legacy physical layer length value by a legacy number of bytes per symbol and subtracting a number of symbols in the separate physical layer preamble;
    forming a packet for transmission on the network, wherein the packet includes the payload, the legacy physical layer preamble and the separate physical layer preamble; and
    transmitting the packet to the network.

2. The method from claim 1, wherein said separate physical layer preamble comprises a high-throughput physical layer convergence protocol or a very high-throughput physical layer convergence protocol.

3. The method from claim 1, wherein said alternative quantum of information comprises a media access control layer duration.

4. The method from claim 1, further comprising:
receiving the transmitted packet with a recipient station; and
setting a network allocation vector in the recipient station based on said alternative quantum of information.

5. The method from claim 1, wherein said network is compliant with one of IEEE 802.11n or draft IEEE 802.11ac standards.

6. The method from claim 1, wherein said legacy physical layer length value in units of bits divided by a legacy rate in units of bits per second is always a factor of a size of said payload.

7. The method from claim 1, wherein said legacy physical layer length value in units of bits divided by a legacy rate in units of bits per second is not always a factor of a size of said payload.

8. The method from claim 7, wherein:
said legacy rate is six megabits per second;
said legacy physical layer length value in bytes is a multiple of three; and
a symbol size in said packet is three point six microseconds.

9. The method from claim 7, further comprising the steps of:
coding said payload and said separate physical layer preamble using a short guard interval coding scheme;
padding said packet by a single symbol if adding an additional symbol to said packet would result in an ambiguous packet size that would map to the same said legacy physical layer length value as said packet without said additional symbol.

10. An apparatus for processing a packet including a legacy physical layer preamble, a separate physical layer preamble and a payload, the apparatus comprising:
a media access control system having a network allocation vector processing system that is configured based on an alternative quantum of information stored in a separate physical layer length field of the separate physical layer preamble; and
a baseband processing system coupled to the media access control system, wherein the baseband processing system includes a legacy signal processor that derives a separate physical layer length value from a legacy physical layer length value of the legacy physical layer preamble, wherein said legacy physical layer length value is expressed in units of bytes, and said separate physical layer length value is derived by dividing said legacy physical layer length value by a legacy number of bytes per symbol and subtracting a number of symbols in the separate physical layer preamble.

11. The apparatus from claim 10, wherein said separate physical layer length field is reappropriated from carrying the separate physical layer length value to carrying the alternative quantum of information.

12. The apparatus from claim 10, wherein a network allocation vector in said network allocation vector processing system is set by said alternative quantum of information.

13. A method for receiving a payload transferred through a network comprising:
receiving a legacy physical layer preamble and a separate physical layer preamble of a packet containing said payload; and
deriving a separate physical layer length value from a legacy physical layer length value in said legacy physical layer preamble, wherein said legacy physical layer length value is expressed in units of bytes, and said separate physical layer length value is derived by dividing said legacy physical layer length value by a legacy number of bytes per symbol and subtracting a number of symbols in the separate physical layer preamble, wherein said separate physical layer preamble includes a separate physical layer length field originally appropriated to carry the separate physical layer length value, wherein said separate physical layer length field is reappropriated to carry an alternative quantum of information;
wherein said legacy physical layer preamble is configured such that said legacy physical layer preamble can be properly received by a set of all stations on a network, even if a legacy station is in said set of all stations.

14. The method from claim 13, wherein deriving the separate physical layer length value comprises converting the legacy physical layer length value from units of bytes into units of symbols.

15. The method from claim 14, further comprising setting a network allocation vector based on said alternative quantum of information carried in the separate physical layer length field of the separate physical layer preamble.

* * * * *